(12) United States Patent
Jin et al.

(10) Patent No.: US 8,269,146 B2
(45) Date of Patent: Sep. 18, 2012

(54) OVEN APPARATUS

(75) Inventors: Jian-Ping Jin, Shenzhen (CN); Cha-Biao You, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 395 days.

(21) Appl. No.: 12/765,423

(22) Filed: Apr. 22, 2010

(65) Prior Publication Data

US 2011/0114628 A1 May 19, 2011

(30) Foreign Application Priority Data

Nov. 13, 2009 (CN) .......................... 2009 1 0309718

(51) Int. Cl.
*F27B 9/06* (2006.01)
*A21B 1/00* (2006.01)
*A21B 1/22* (2006.01)

(52) U.S. Cl. ......... 219/388; 219/400; 219/409; 219/411

(58) Field of Classification Search .................. 219/388, 219/400, 409, 411
See application file for complete search history.

(56) References Cited

U.S. PATENT DOCUMENTS

| | | | | |
|---|---|---|---|---|
| 4,516,012 A | * | 5/1985 | Smith et al. | 219/400 |
| 4,597,736 A | * | 7/1986 | Moffat | 432/26 |
| 5,277,104 A | * | 1/1994 | Colaner | 99/331 |
| 5,674,425 A | * | 10/1997 | Hong | 219/681 |
| 5,686,004 A | * | 11/1997 | Schneider | 219/388 |
| 6,936,793 B1 | * | 8/2005 | Shiloh et al. | 219/400 |
| 7,196,291 B2 | * | 3/2007 | Cothran | 219/394 |

* cited by examiner

*Primary Examiner* — Mohsen Ahmadi
(74) *Attorney, Agent, or Firm* — Altis Law Group, Inc.

(57) ABSTRACT

An oven apparatus for solidifying a coating on a housing includes a supporting module, a curing module, and a transporting module. The supporting module includes a frame and of periphery boards around the frame, the frame includes at least two stacked frame sections. The curing module and the heating module are respectively mounted to the frame sections, the transporting module circularly transports the housing and passes though the heating module and heating module.

10 Claims, 6 Drawing Sheets

OVEN APPARATUS

BACKGROUND

1. Technical Field

The disclosure relates to oven apparatuses, and particularly to an oven apparatus that can be used for curing and/or heating coatings on a housing of an electronic device.

2. Description of Related Art

An electronic device housing can have coatings formed on its external surfaces. The coatings may be Polyurethane (PU) inks and Ultraviolet (UV) inks that are cured or solidified to create an upgraded aesthetic appearance. During the curing or solidifying process, a PU oven apparatus and a UV oven can solidify the PU inks and the UV inks by heating and curing with Ultraviolet light, respectively.

The PU oven and the UV oven are arranged in a line. A conveyor belt carries the housing between the PU oven and the UV oven. However, this arrangement may occupy a large space.

Therefore, there is room for improvement within the art.

BRIEF DESCRIPTION OF THE DRAWINGS

Many aspects of the present oven apparatus can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

The disclosure of the oven apparatus can be applied for UV curing and PU heating of coated housings of portable electronic devices such as a mobile phone.

Figure 1:
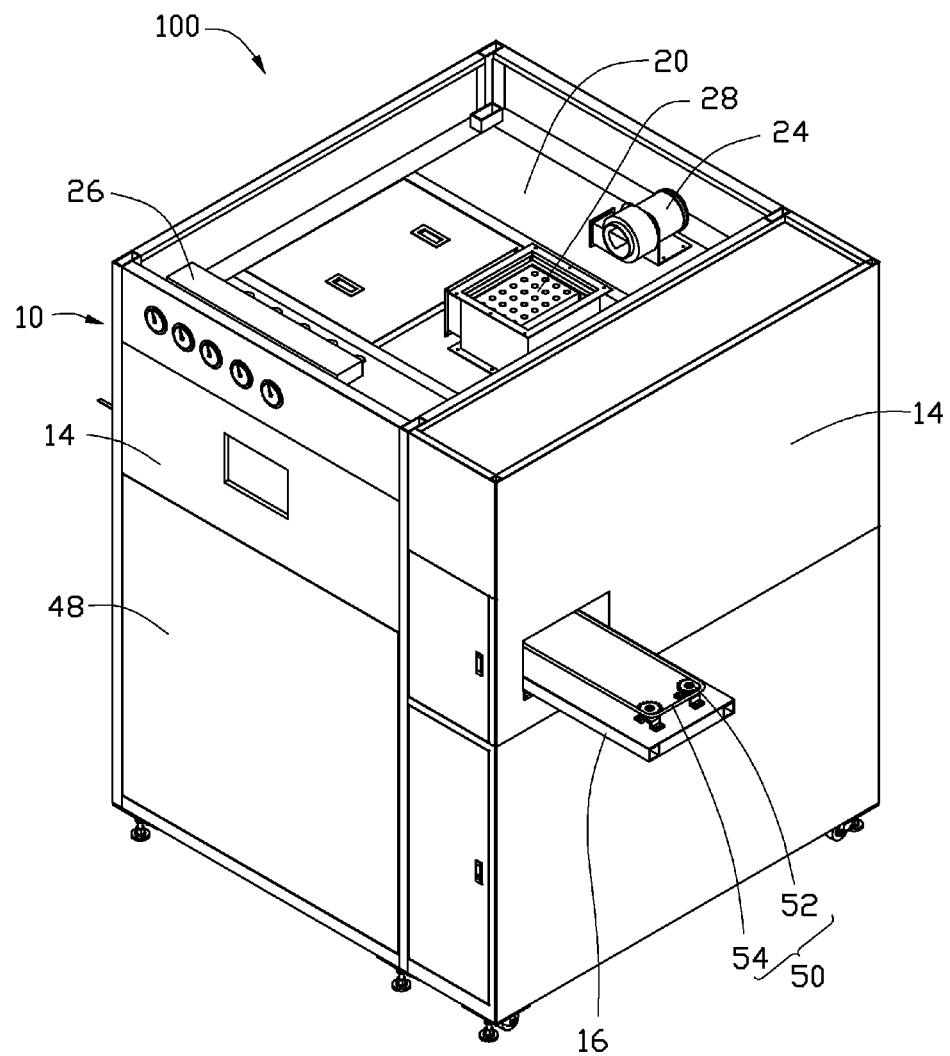
FIG. 1 is an assembled isometric view of an oven apparatus according to an exemplary embodiment.
Figure 2:
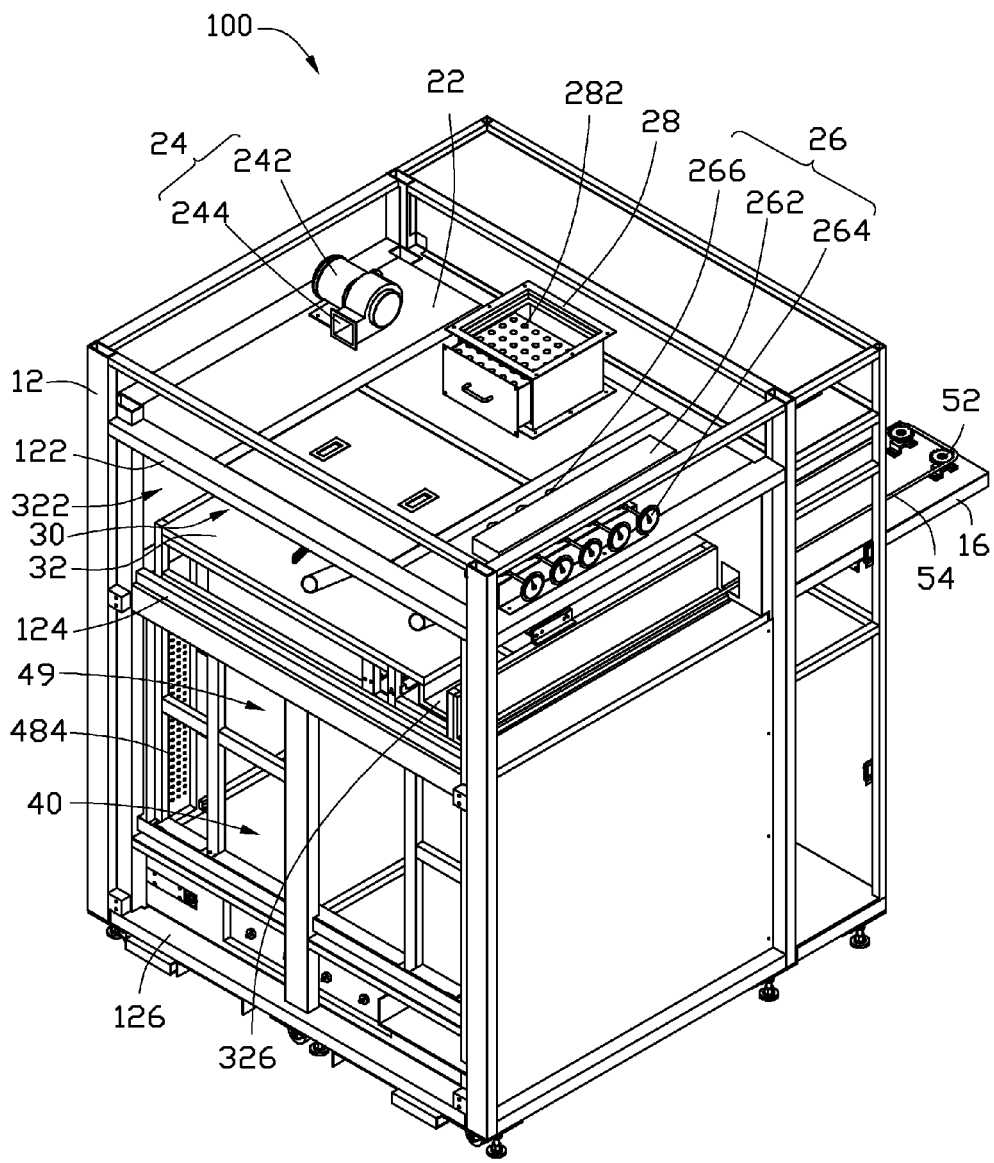
FIG. 2 is an assembled isometric view of an oven apparatus without periphery boards shown in FIG. 1.

Referring to FIGS. 1 and 2, the oven apparatus 100 includes a supporting module 10, an air drafting module 20, a curing module 30, a heating module 40 and a transporting module 50. The air drafting module 20, the curing module 30, the heating module 40, and the transporting module 50 are assembled in the supporting module 10.

The supporting module 10 includes a frame 12, periphery boards 14 connecting the frame 12 and an extending plate 16 extending from the frame 12. The frame 12 includes an upper frame section 122, a middle frame section 124 and a bottom frame section 126. The upper frame section 122 secures the air drafting module 20, the middle frame section 124 secures the curing module 30 and the bottom frame section 126 secures the heating module 50. The periphery boards 14 and the frame 12 cooperatively enclose a first chamber 322 and a second chamber 49 under the first chamber 322.

The air drafting module 20 can adjust the working temperature of the curing module 30. The air drafting module 20 includes an assembling board 22, an air drafter 24, an adjusting valve 26 and an air-inlet port 28. The assembling board 22 has the air drafter 24, the adjusting valve 26 and the air-inlet port 28 assembled thereon. The assembling board 22 assembles in the upper frame section 122 of the frame 12. The air drafter 24 includes a driving unit 242, an outlet 244, and a plurality of air pipes (not shown) below the assembling board 22. The air pipes communicate with the adjusting valve 26 and the outlet 244. The driving unit 242 drafts air from the first chamber 322 and expels the air through the air pipes and the outlet 244 to outside. The adjusting valve 26 includes a valve case 262, a plurality of knobs 264, and a plurality of guiding pipes 266. The valve case 262 connects the air pipes and the guiding pipes 266. The knobs 264 are mounted on the guiding pipes 266. The guiding pipes 266 extend to the first chamber 322 and are adjacent to the curing module 30. The air-inlet port 28 defines a through hole (not labeled) through the assembling board 22. The air-inlet port 28 includes a filtering plate 282 detachably covering the through hole. The filtering plate 282 is positioned on the assembling board 22 and filters the air entering into the first chamber 322, and the air can be absorbed into the guiding pipes 266.

Figure 3:
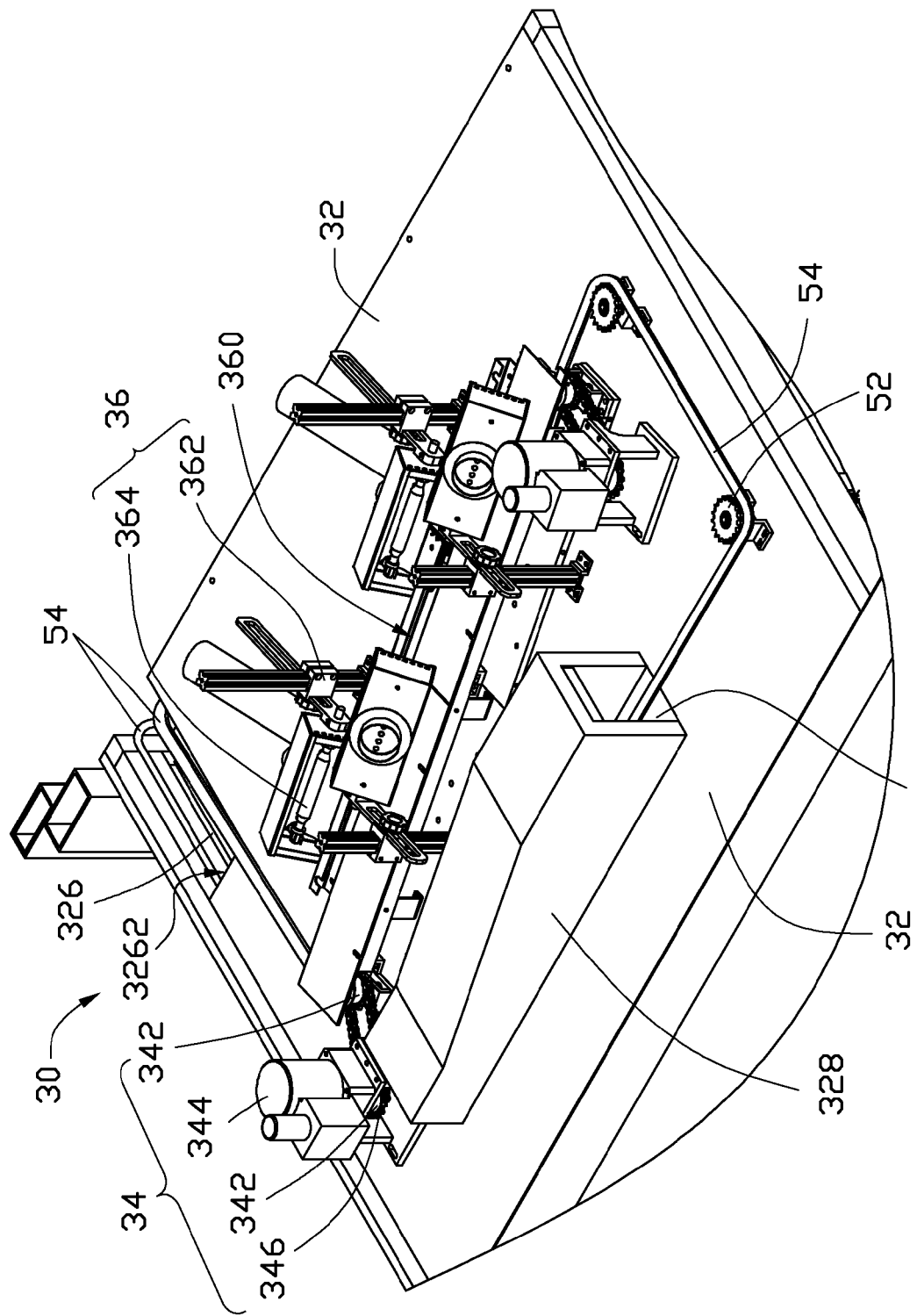
FIG. 3 is a disassembled partial view of the oven apparatus shown in FIG. 2.

Referring further to FIG. 3, the curing module 30 can cure UV coated housings. The curing module 30 includes a supporting plate 32, two gearing mechanisms 34, and a plurality of UV lamp assemblies 36. The supporting plate 32 supports the two gearing mechanisms 34 and the UV lamp assemblies 36. The supporting plate 32 assembles on the middle frame section 124. Accordingly, the supporting plate 32, the assembling board 22 and the periphery boards 14 cooperatively enclose the first chamber 322. The supporting plate 32 defines a slot 324 and a recess 326 at the corner. The slot 324 runs though the supporting plate 32 and interconnects the second chamber 49 to guide the transportation of the transporting module 50. A shield 328 covers the slot 324 and prevents dust from entering the slot 324, the recess 326 has a sidewall 3262 at an end thereof, the sidewall 3262 defines a hole (not labeled) interconnecting with the second chamber 49 to guide transportation of the transporting module 50. The two gearing mechanisms 34 are positioned adjacent to two sides of the supporting plate 32. Each gearing mechanism 34 includes two gear wheels 342 arranged on the supporting plate 32, a motor 344 connecting one gear wheel 342, and a chain 346 mating with the two gear wheels 342 and driven by the motor 344. The gear wheel 342 engages with the transporting module 50. Therefore, the motor 344 can drive the transporting module 50. The UV lamp assemblies 36 are spaced positioned on the supporting plate 32 and form a curing passage 360 for the passage of the transporting module 50. Each UV lamp assembly 36 includes a supporting frame 362 and a UV lamp 364 assembled in the supporting frame 362, the supporting frame 362 secures the guiding pipes 266 (not shown in FIG. 3), and air adjacent to the UV lamp 364 is guided by and absorbed by the guiding pipe 266 to cool the UV lamp 364.

Figure 4:
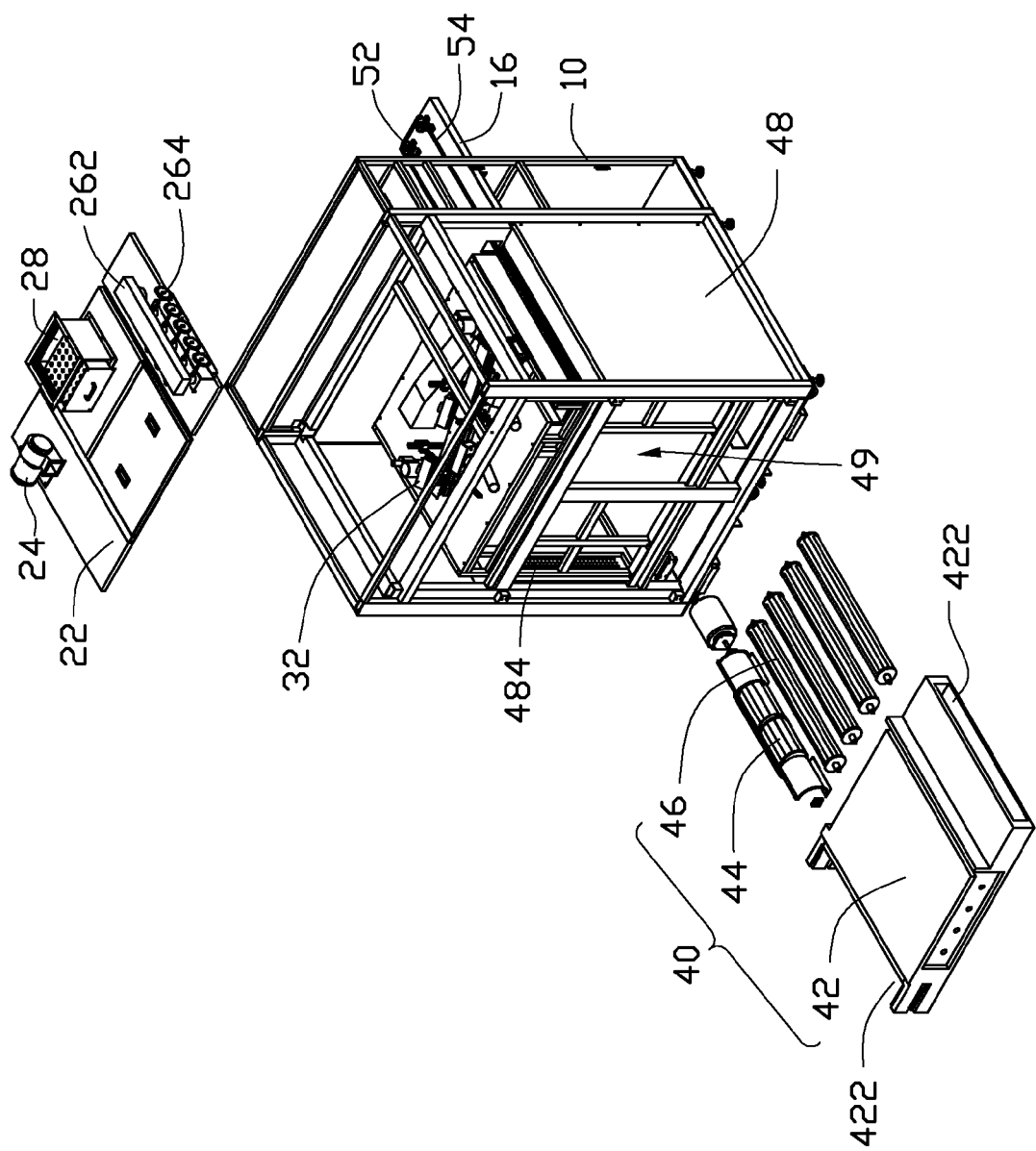
FIG. 4 is a larger schematic view of a curing module of the oven apparatus shown in FIG. 2.
Figure 5:
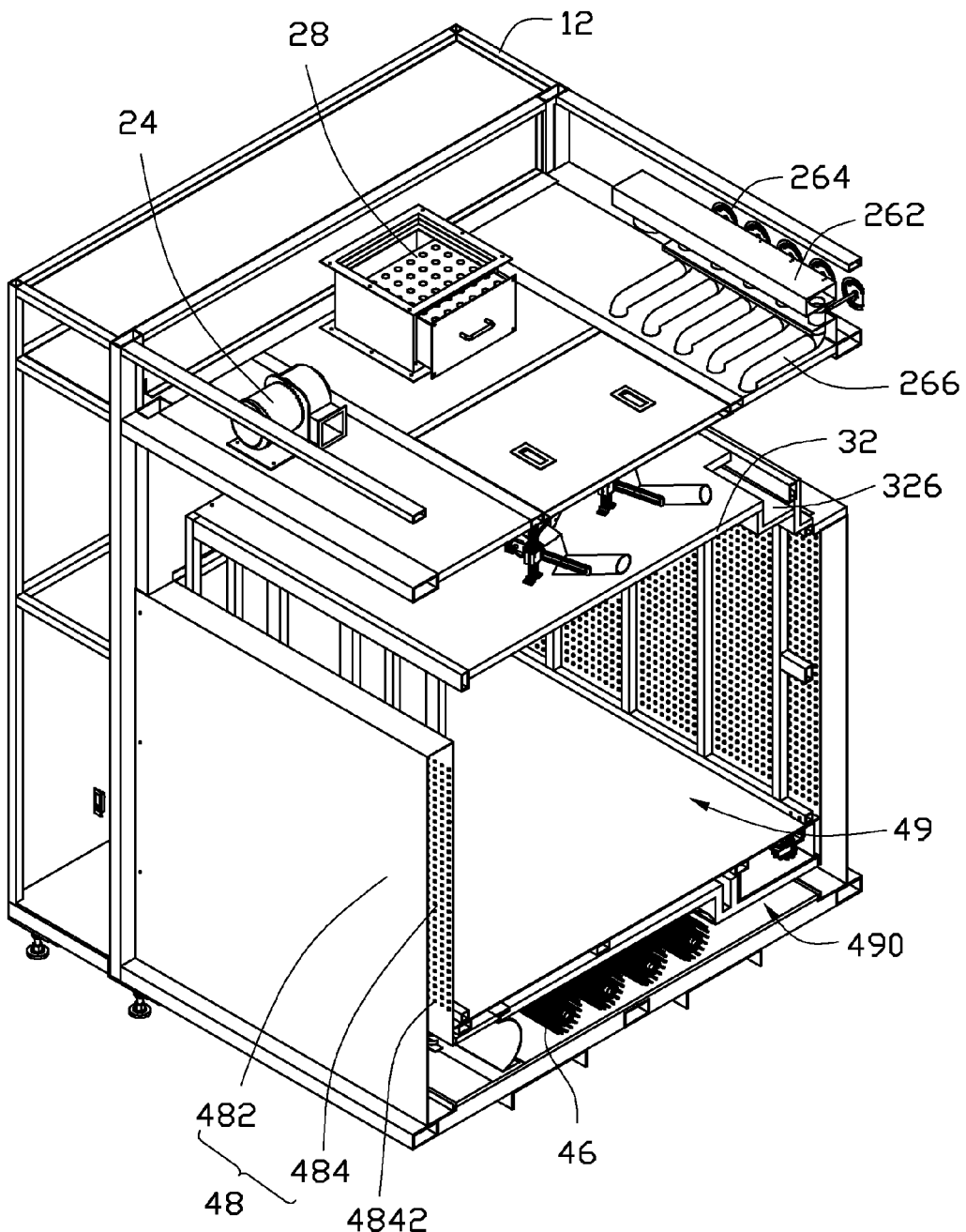
FIG. 5 is a sectional view of the oven apparatus shown in FIG. 2.
Figure 6:
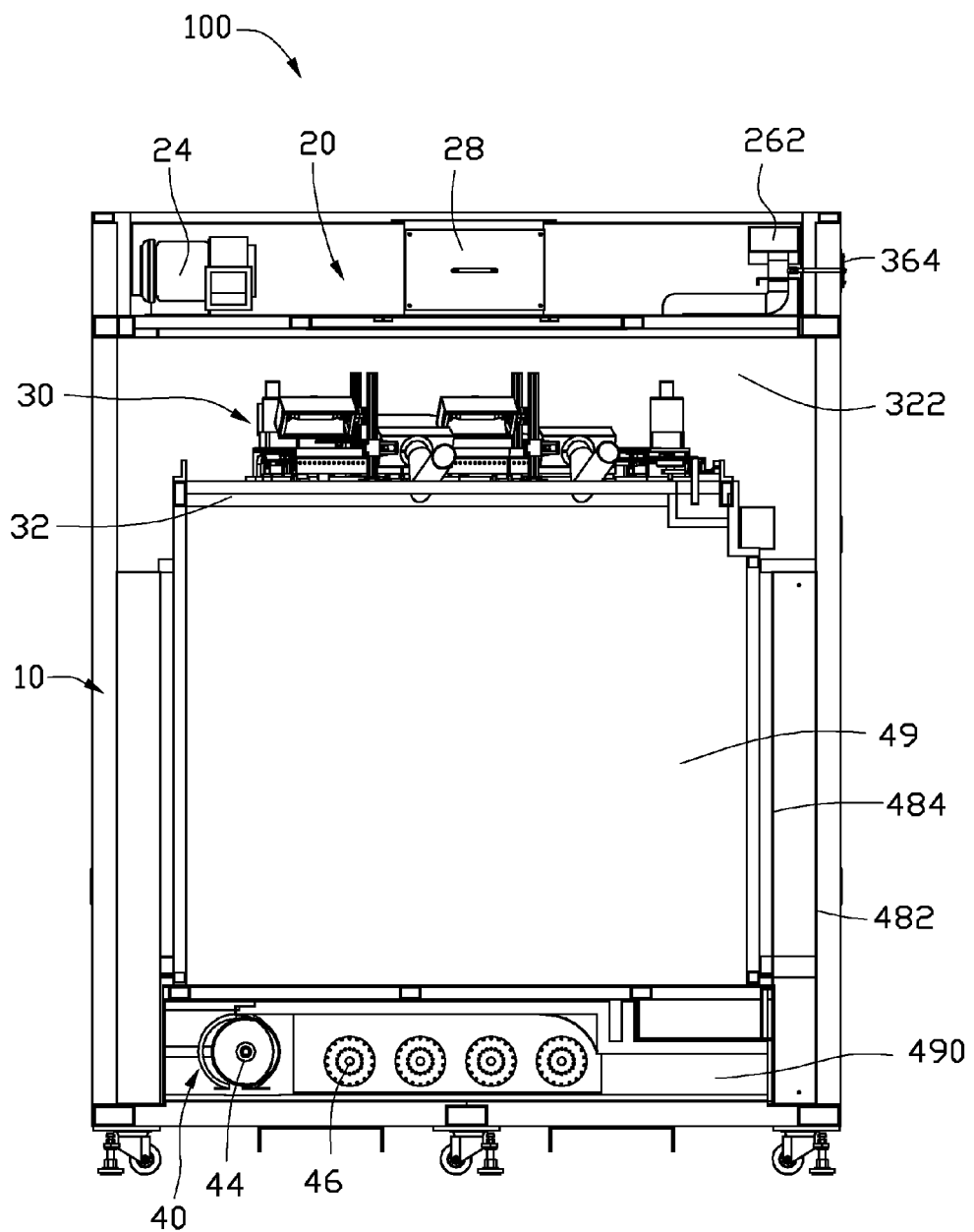
FIG. 6 is a lateral view of the oven apparatus shown in FIG. 1.

Referring to FIGS. 4 and 6, the heating module 40 can heat the housing having a UV coating. The heating module 40 includes a box 42, a blowing unit 44, heating coils 46 and two windshield boards 48. The box 42 is a hollow body and defines two opposite openings 422. The blowing unit 44 and the heating coils 46 are assembled into the box 42. The blowing unit 44 blows hot air when the heating coils 46 are heated. Referring further to FIG. 5, the windshield board 48 includes an airproof peripheral wall 482 and a venting internal wall 484 parallel to the peripheral wall 482. The internal wall 484 defines a plurality of through apertures 4842. The box 42 can be assembled on the bottom frame section 126 of the frame 12, the windshield boards 48 are fixed at the sides of the frame 12, and each windshield board 48 interconnects openings 422 of the box 42. The periphery boards 14 (not shown on FIGS. 4 and 5) are arranged at the other opposite sides of the frame 12, enclosing the second chamber 49. The second chamber 49 accommodates part of the transporting module 50 (not shown in FIGS. 5 and 6). Accordingly, the inside space of the box 42, the insides space of the windshield boards 48 and the second chamber 49 communicate to define a gas path 490.

Referring back to FIGS. 2 and 3, the transporting module 50 includes a plurality of driving wheels 52 and a conveyor belt 54. The driving wheels 52 are assembled on the extending plate 16, the supporting plate 32 and the frame 12. The conveyor belt 54 is wrapped around the driving wheels 52 and engages with the gearing mechanisms 34, accordingly, the conveyor belt 54 can be driven by the gearing mechanisms 34 to rotate. The conveyor belt 54 can run inside and between the first chamber 322 and the second chamber 49.

During assembly of the oven apparatus 100, the heating module 40 is assembled to the frame 12. The blowing unit 44 and the heating coils 46 are positioned into the box 42 and the box 42 is placed onto the bottom frame section 126 of the frame 12. The supporting plate 32 of the curing module 30 is secured to the middle frame section 124 of the frame 12, and the assembling board 22 of the air drafting module 20 is placed on the first wall 122. The conveyor belt 54 is mounted to the driving wheels 52. The periphery boards 14 and the two windshield boards 48 are respectively assembled to the frame 12 and enclose the first chamber 322 and the second chamber 49. Therefore, the oven apparatus 100 is assembled.

In use, the housing having UV coatings and PV coatings is positioned on the conveyor belt 54. The curing module 30 is started, and the gearing mechanism 34 drives the conveyor belt 54 to rotate. Meanwhile, the UV lamp assemblies 36 turn on for curing the UV coatings of the housing. The air drafting module 20 is started to control the curing intensity of the UV lamp assemblies 36. The air is drafted by the air drafter 24 and enters into the first chamber 322 through the air-inlet port 28, the air is expelled to outside through the guiding pipes of the adjusting valve 26, the air pipes and the outlet 244. Because the guiding pipes can be adjusted by the knobs 264 to cool the UV lamp 364, the curing intensity of the UV lamp assemblies 36 can be adjusted by the knobs 264. When the housing is transported into the second chamber 49 by the conveyor belt 54, the heating module 50 heats and solidifies the PU coatings. The heating coils 46 are heated, and the blowing unit 44 blows hot air from the heating coils 46 into the second chamber 49. Thus, the housing heats in the second chamber 49 and then transports out of the oven apparatus 100 by the conveyor belt 54.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An oven apparatus for solidifying a coating on a housing, comprising:
    a supporting module including a frame and of periphery boards connecting the frame, the frame including an upper frame section, a middle frame section and a bottom frame section;
    an air drafting module;
    a curing module;
    a heating module; and
    a transporting module, wherein the air drafting module is assembled in the upper flame section, the curing module is mounted to the middle flame section and the heating module is secured to the bottom flame section, correspondingly, to form a first chamber and a second chamber, the transporting module transports the housing between the first chamber and the second chamber, the curing module cures the coating on the housing and the heating module heats the coating on the housing;
    wherein the air drafting module includes an assembling board, an air drafter, an adjusting valve and an air-inlet port, the assembling board is mounted on the upper frame section, the air drafter pumps air out of the first chamber, the adjusting valve coordinates an intensity of the air, the air-inlet port allows air to enter into the first chamber;
    wherein the adjusting valve includes a valve case, a plurality of guiding pipes connecting to the valve case, and a plurality of knobs set on the guiding pipes correspondingly, the valve case connects to the air-inlet port and the guiding pipes extend to engage with the curing module;
    wherein the curing module includes a supporting plate, two gearing mechanisms, a plurality of UV lamp assemblies, the gearing mechanisms and the UV lamp assemblies are arranged on the supporting plate, the supporting plate is secured on the middle frame section, the gearing mechanisms drives the transporting module run, the UV lamp assemblies cures the coating on the housing.

2. The oven apparatus as claimed in claim 1, wherein the supporting plate defines a through slot allowing the transporting module to enter into the second chamber.

3. The oven apparatus as claimed in claim 1, wherein each gearing mechanism includes two gear wheels arranged on the supporting plate, a motor mounted on one of the gear wheels to drive the transporting module, and a chain matched with the two gear wheels.

4. The oven apparatus as claimed in claim 1, wherein the UV lamp assemblies are arranged on the supporting plate to form a curing passage for the transporting module to pass through.

5. The oven apparatus as claimed in claim 1, wherein the UV lamp assembly includes a supporting frame and an UV lamp assembled in the supporting frame, air guided by and drafted from the guiding pipes of the adjusting valve can cool the UV lamp.

6. The oven apparatus as claimed in claim 1, wherein the heating module includes an box, a blowing unit, and heating coils, the blowing unit and the heating coils are assembled into the box, the box is secured on the bottom frame section of the frame.

7. The oven apparatus as claimed in claim 1, wherein the heating module includes two windshield boards, the two windshield boards are assembled at two sides of the frame to enclose the second chamber.

8. The oven apparatus as claimed in claim 7, wherein each windshield board includes an air-proof peripheral wall and a venting internal wall, the internal wall defines a plurality of through apertures.

9. The oven apparatus as claimed in claim 1, wherein the transporting module includes a plurality of driving wheels and a conveyor belt, the conveyor belt wrapped around the driving wheels and engages with the gearing mechanisms.

10. The oven apparatus as claimed in claim 9, wherein the supporting module include an extending plate extending from the frame, the extending plate has a section of the conveyor belt assembled thereon for assembly of the coated housing.

* * * * *